(12) United States Patent
Layton et al.

(10) Patent No.: US 7,647,848 B2
(45) Date of Patent: Jan. 19, 2010

(54) INTEGRATED SYSTEM FOR SIMULTANEOUS INSPECTION AND MANIPULATION

(75) Inventors: Bradley E. Layton, Havertown, PA (US); Gregory Buzby, Woodstown, NJ (US)

(73) Assignee: Drexel University, Philadelphia, PA (US)

( * ) Notice: Subject to any disclaimer, the term of this patent is extended or adjusted under 35 U.S.C. 154(b) by 289 days.

(21) Appl. No.: 11/564,678

(22) Filed: Nov. 29, 2006

(65) Prior Publication Data
US 2007/0227273 A1    Oct. 4, 2007

Related U.S. Application Data

(60) Provisional application No. 60/740,485, filed on Nov. 29, 2005.

(51) Int. Cl.
*G01M 19/00* (2006.01)
(52) U.S. Cl. .................................................. 73/865.8
(58) Field of Classification Search .................. 73/105, 73/78, 788, 79, 865.8
See application file for complete search history.

(56) References Cited

U.S. PATENT DOCUMENTS

| | | | |
|---|---|---|---|
| 3,953,776 A | 4/1976 | Wolf | 388/814 |
| 4,117,320 A | 9/1978 | Tominson et al. | 250/237 G |
| 5,138,878 A * | 8/1992 | Cresson et al. | 73/159 |
| 5,237,859 A | 8/1993 | Elings et al. | 73/105 |
| 5,329,808 A | 7/1994 | Elings et al. | 73/105 |
| 5,438,206 A | 8/1995 | Yokoyama et al. | 250/442.11 |
| 5,496,999 A | 3/1996 | Linker et al. | |
| 5,557,156 A | 9/1996 | Elings | 310/316.01 |
| 5,675,154 A | 10/1997 | Lindsay et al. | 250/442.11 |
| 5,714,682 A | 2/1998 | Prater et al. | 73/105 |
| 5,760,396 A | 6/1998 | Lindsay et al. | 250/306 |
| 5,874,668 A | 2/1999 | Xu et al. | 73/105 |
| 5,886,684 A * | 3/1999 | Miura et al. | 345/161 |
| 5,958,701 A | 9/1999 | Green et al. | 435/6 |
| 5,992,226 A | 11/1999 | Green et al. | 73/105 |
| 6,392,229 B1 | 5/2002 | Dana et al. | 250/306 |
| 6,398,280 B1 | 6/2002 | Parker et al. | 294/86.4 |
| 6,608,307 B1 | 8/2003 | Baur | 250/306 |
| 6,672,795 B1 | 1/2004 | Ellis et al. | 403/327 |
| 6,677,225 B1 | 1/2004 | Ellis et al. | 438/598 |
| 6,723,299 B1 | 4/2004 | Chen et al. | 423/447.1 |
| 6,745,567 B1 | 6/2004 | Mercanzini | 60/527 |

(Continued)

OTHER PUBLICATIONS

Layton, B.E. et al., "Nanomanipulation and Characterization of Structural Proteins," 26th Annual International Conference IEEE-EMBS, 2004.

(Continued)

*Primary Examiner*—Hezron Williams
*Assistant Examiner*—Tamiko D Bellamy
(74) *Attorney, Agent, or Firm*—Knoble, Yoshida & Dunleavy, LLC (57) ABSTRACT

A base unit for integrating an imaging device, such as an atomic force microscope, and a manipulation device, such as a nano-manipulator. The integration of the two devices permits one device to perform both imaging and manipulation simultaneously. The simultaneous execution of these two tasks increases the rate at which experiments can be conducted, thereby improving the throughput of the device. Also, the simultaneous execution of these two tasks allows imaging during manipulation, which may be desirable or beneficial in some circumstances.

18 Claims, 8 Drawing Sheets

U.S. PATENT DOCUMENTS

| | | | |
|---|---|---|---|
| 6,837,723 B1 | 1/2005 | Randall et al. | 439/161 |
| 6,887,450 B2 | 5/2005 | Chen et al. | 423/445 R |
| 6,891,170 B1 | 5/2005 | Yu et al. | 250/442.11 |
| 6,923,669 B1 | 8/2005 | Tsui et al. | 439/353 |
| 6,967,335 B1 | 11/2005 | Dyer et al. | 250/442.11 |
| 6,973,365 B1 | 12/2005 | Mercanzini | 700/120 |
| 6,987,277 B2 | 1/2006 | Baur | 250/492.2 |
| 7,008,769 B2* | 3/2006 | Henderson et al. | 435/6 |
| 7,019,895 B2 | 3/2006 | Russum et al. | 359/396 |
| 7,036,357 B2 | 5/2006 | Adderton et al. | 73/105 |
| 7,037,319 B2 | 5/2006 | Weber | 606/192 |
| 7,040,147 B2 | 5/2006 | Chand et al. | 73/105 |
| 7,044,007 B2 | 5/2006 | Struckmeier et al. | 73/862.51 |
| 7,048,062 B2 | 5/2006 | Ring et al. | 166/380 |
| 7,096,568 B1 | 8/2006 | Nilsen et al. | 29/611 |
| 7,096,711 B2 | 8/2006 | Chand et al. | 73/1.89 |
| 2005/0146708 A1* | 7/2005 | Shi et al. | 356/35.5 |
| 2005/0275232 A1* | 12/2005 | Horie et al. | 294/86.4 |

OTHER PUBLICATIONS

Layton, B.E. et al., "Towards a Method for Peripheral Nervous System Axonal Stiffness Measurements with MEMS-based Microgrippers," Proceedings of the 2nd International IEEE EMBS Conference on Neural Engineering, 2005.

Baldi, A. et al., "A Micro-tool for Mechanical Manipulation of in vitro Cell Arrays," Biomedical Microdevices, 2003, 291-295, vol. 5, No. 4.

Fass, Joseph N. and Odde, David J., "Tensile Force-Dependent Neurite Elicitation via Anti-Beta1 Integrin Antibody-Coated Magnetic Beads," Biophysical Journal, 2003, 623-636, vol. 85, No. 1.

Layton, Bradley E., "Self-Assembly Limited in Structural Proteins," Proceedings of ASME-INDSA: ASME Integrated Nanosystems, 2004.

Xie, Changjin and Tong, Wei, "Cracking and Decohesion of a Thin Al2O3 Film on a Ductile Al-5%Mg Substrate," Acta Materialia, 2005, 477-485, vol. 53.

Jobin, M. et al, "Versatile Force-Feedback Manipulator for Nanotechnology Applications," Review of Scientific Instruments, 2005, Article No. 053701, vol. 76, No. 5.—Abstract only.

* cited by examiner

INTEGRATED SYSTEM FOR SIMULTANEOUS INSPECTION AND MANIPULATION

STATEMENT OF GOVERNMENT INTEREST

This invention was reduced to practice with Government support under Grant No. 0421033 awarded by the National Science Foundation ("NSF"); the Government is therefore entitled to certain rights to this invention.

BACKGROUND OF THE INVENTION

1. Field of the Invention

The invention relates to the field of inspection. In particular the invention relates to a device and method for the provision of simultaneous inspection and manipulation of a sample.

2. Description of the Related Technology

All biological materials have mechanical properties that make them suitable for their purposes in their respective environments. Understanding these mechanical properties and how to alter them is a major goal of biomedical and materials engineering. Before applications of new technology can be achieved, a fundamental understanding of the materials is necessary.

Fundamental to almost all biological systems is the protein collagen. So fundamental is it in humans that it is the most abundant protein, with twenty nine genetically distinct types.

Basic to the collagen molecule is a triple helix structure made of three monomeric units. These three monomeric units, made of two alpha sub 1-chains and one alpha sub 2 chain, form a triple helical structure. This triple helix structure is called a tropocollagen. The biological systems incorporating collagen make appropriate use of its simultaneous strength, elasticity and flexibility. This also implies that the structural hierarchy of collagen is complementary to its mechanical properties.

Applications which could be based on an understanding these mechanical properties include the engineering of improved sponge-like scaffolds for tissue implants as for nerves, bones, and skin. It may also be possible to assess creep behavior for long-term delivery of collagen into the body for tissue engineering applications. Specifically, for cornea replacement surgeries, blood clotting prevention, and drug delivery discs, films and sheets.

The main constituent of the central and peripheral nervous systems are neurons. Neurons differ in their size, location and overall structure. Depending on where they are in the body and the type of information they process, they will take on different properties. Understanding how these neurons behave under mechanical stresses can provide insight into the mechanisms behind neuronal repair that would provide much needed information for those investigating paralysis, or neuronal death. Understanding how different neurons respond to mechanical stresses will provide insight to understanding their relative positions in the body and the extent of their abilities. Relating mechanical stresses to electrical activity of these neurons will provide much information for mimicking, replicating, regenerating, manipulating or replacing these electrical units of the body.

Flagella are a class of projections concerning eukaryotes and prokaryotes. Understanding the mechanical properties of bacterial flagella would allow for relating structure to motor properties. These include both intracellular and extracellular motor properties. By understanding how these cellular motors work, it would be a possible to create a first step toward mimicking cellular motors with the optimization that evolution has granted to biological systems. This could allow for drug delivery systems that could actually be propelled through the body with biological materials rather than foreign agents that the body might reject. Also, mechanical characterization could allow for better understanding of bacterial mobility and nutrient uptake since flagella accomplish both of these undertakings.

Though not a direct aspect of biological systems, carbon nanotubes are potentially beneficial to biological systems because of their carbon makeup which is common to organic systems. Carbon nanotubes can be either single-wall or multi-walled tubes, all of which have very high strength, flexibility and resilience.

Understanding the mechanical properties of carbon nanotubes is useful in a biological context because they may be incorporated into bone grafts and tissue scaffolds. Understanding the appropriate ratios, compositions and alignments of these tubes in these biological systems could optimize protocols in carbon nanotube-based composites for tissue engineering. In addition, the electrical properties of carbon nanotubes can be altered with applied stresses, which could have useful implications in neuronal networks.

Simultaneous nanomanipulation and atomic force microscopy would therefore be useful in many contexts to study the properties of various materials. However, it does not appear to be possible to effectively perform nanomanipulation and atomic force microscopy using the same tool. While nanomanipulators and atomic force microscopes are commercially available, there are no existing devices that permit simultaneous nano-manipulation and atomic force microscopy. Therefore in order to perform an experiment involving these tools it is sometimes necessary to transport samples to various different locations and utilize more than one device. This increases the risk of sample loss or contamination, and also increases the time that it takes to accomplish an experiment or complete a task.

Currently there are some atomic force microscopes that have the ability to do nanomanipulation and nano-scribing, however they are limited by having a single probe tip that must run in either a manipulation mode or an imaging mode. Being able to conduct manipulation simultaneously and independently from imaging allows the improvement of experimental throughput for nanomanipulation, mechanical characterization and bio-sensing.

Therefore, there exists a need for providing an effective means for combining both atomic force microscopy and nanomanipulation into an integrated device that permits simultaneous nanomanipulation and atomic force microscopy.

SUMMARY OF THE INVENTION

Accordingly, it is an object of certain embodiments of the invention to provide a base unit for integrating an inspection device and a manipulating device. The integration of the two devices permits the integrated device to simultaneously perform both inspection and manipulation. The combination of these two tasks increases the rate at which experiments can be conducted and allows samples to be inspected while being deformed, immediately prior to deformation, or subsequent to deformation by manipulation.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The instant invention relates to a base unit the permits the integration of an imaging device such as an atomic force microscope (AFM) and a manipulation device, such as a nano-manipulator. The integrated device is useful as a high-throughput manipulation platform for, for example, cells, microscopic specimens, and nanoscopic specimens. The integrated device is also useful for strain gradient imaging of materials such as metals, polymers, proteins, living cells, and fixed cells. It can also be used for electric field potential imaging and magnetic field imaging of metals, polymers, proteins, and living or fixed cells.

The device of the present invention provides the ability to image a sample being mechanically strained allowing of topographical imaging of the material. This permits real-time viewing of the visual behavior of biological specimens or other materials. In addition, the ability of an AFM to probe biological specimens with a tip specifically fitted for such applications will potentially provide information about specific antigens along the surface of the tested biological specimens. While the nano-manipulator is performing series of mechanical stresses, the other capabilities of AFM such as force/displacement measurements in several modes would allow for determination of properties like elastic modulus or relative hardness of the material. It would also be possible to use phase imaging techniques to assess the viscoelastic properties along the length of the biological specimens.

Figure 1:
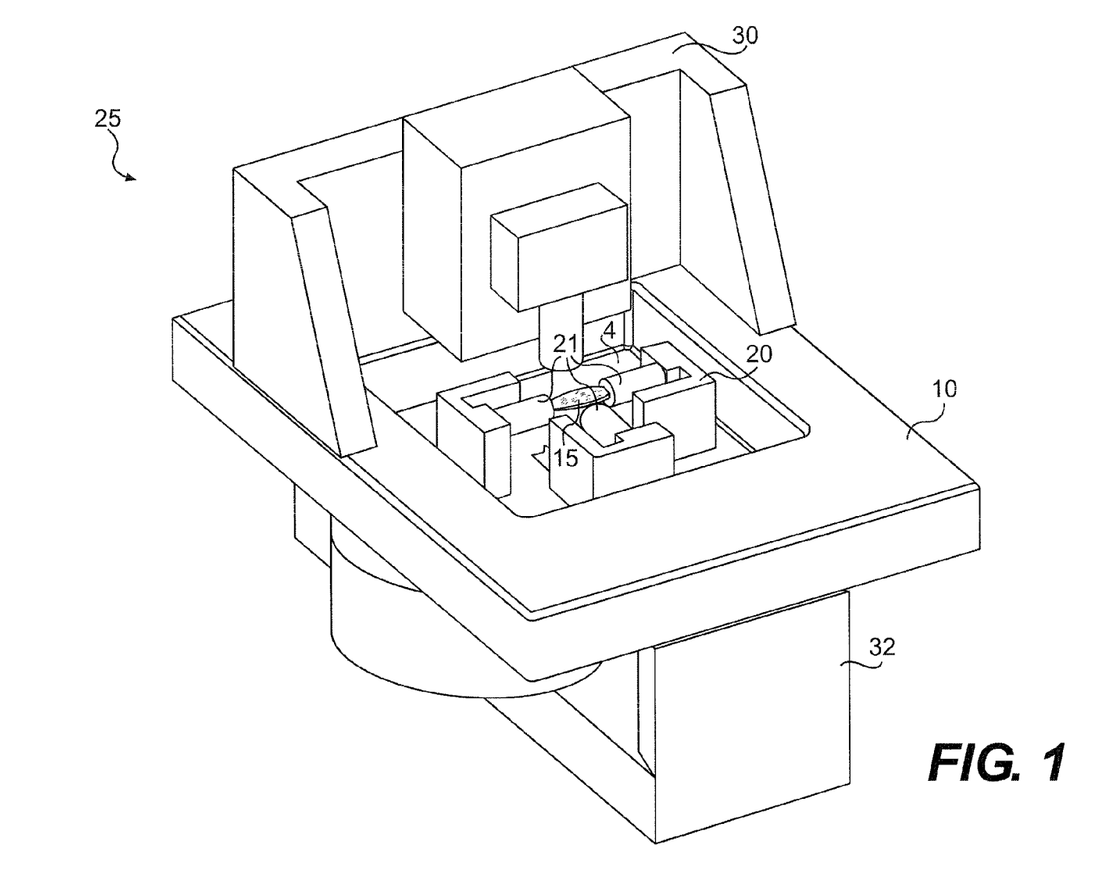
FIG. 1 shows a perspective view of a base unit used in conjunction with an atomic force microscope and a nanomanipulator.

FIG. 1 shows integrated device 25. Base unit 10 integrates AFM 30 and nanomanipulator 20 by enabling the two devices to be used in conjunction. Preferably base unit 10 is constructed of material with a sufficiently high mass in order to reduce vibration that may interfere with experiments. In the instant embodiment base unit 10 is constructed of stainless steel. Also provided in the depicted embodiment is an inverted light microscope 32. Inverted light microscope 32 is useful for conducting sub-cellular experiments.

In FIG. 1, sample 15 is placed at a location where it is accessible to both AFM 30 and nanomanipulator 20. Base unit 10 allows the AFM tip of AFM 30 to be devoted to imaging, while a nanomanipulator 20 can apply forces or displacements to sample 15. This reduces the need for a single sample to be moved among various devices for a single experiment. This permits greater throughput in a series of nanoscale experiments. Integrated device 25 allows samples 15 to be imaged while manipulated, or alternatively immediately before or after being manipulated.

Nanomanipulator 20 shown in FIG. 1 is a Zyvex L100™ nanomanipulator. Its future complementary scanning probe microscopy system is the Nanoscope IIIa™ from Digital Instruments.

Nanomanipulator 20 has three robotic arms 21. Two of the opposing robotic arms 21 have full continuous 360° degree rotation. One of the robotic arms 21 has three coarse axes and three fine axes controlled by an actuation mechanism similar to that of the AFM piezoelectric actuator 4. Although a Zyvex L100™ nano-manipulator is used in the depicted embodiment, it is possible to modify base unit 10 to accommodate other nano-manipulators. Alternatively, the base unit 10 can be used to accommodate other types of conventional manipulation devices, and particularly, conventional manipulation devices capable of multi-axis manipulation, including manipulation in three dimensions.

AFM 30 shown in FIG. 1 is a Digital Instruments Dimension 3000™ atomic force microscope. Both nanomanipulator 20 and atomic force microscope 30 have piezoelectric actuators. The piezoelectric actuators operate by supplying an oscillating electric waveform to a confined piezoelectric crystal that bends and straightens itself against a ceramic bearing surface. Although a Digital Instruments Dimension 3000™ atomic force microscope is used in the depicted embodiment, it is possible for one to modify base unit 10 to accommodate other conventional imaging devices for which sample manipulation during imaging may be desirable. Also, other types of atomic force microscopes can also be accommodated.

Figure 2:
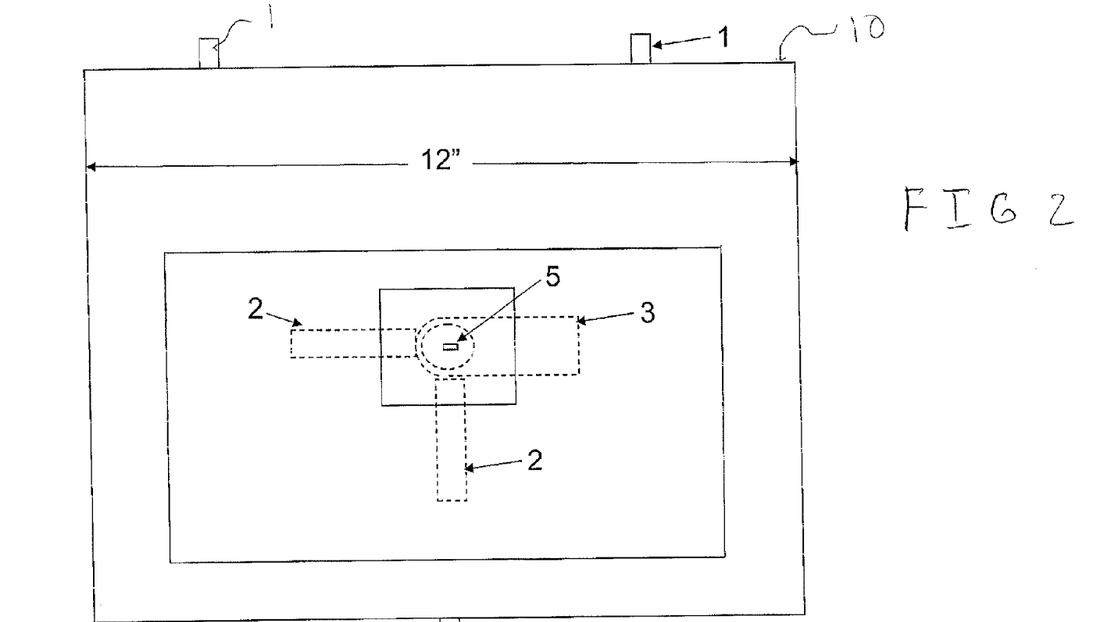
FIG. 2 shows a top view of the base unit used in an integrated device.
Figure 3:
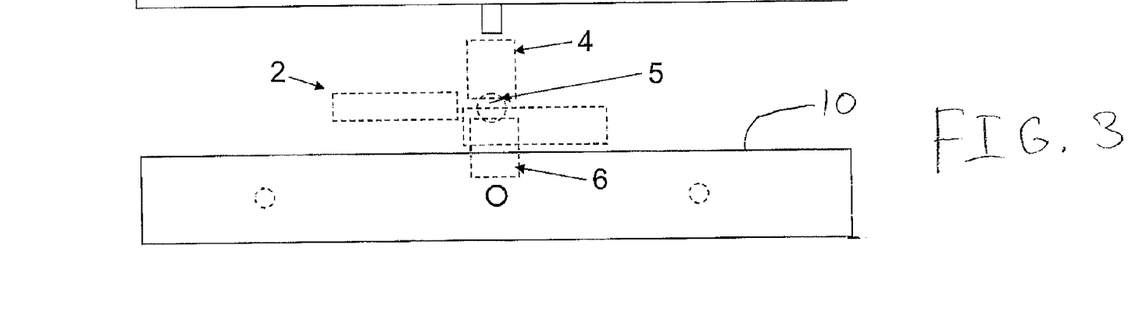
FIG. 3 shows a front view of the base unit used in an integrated device.

FIG. 2 shows a top view of base unit 10. Positioning pins 1 are used to position base unit 10 to permit integration of AFM 30 and nanomanipulator 20. Positioning pins 1 are placed within pin channels 8, shown in FIGS. 4b and 5b. Nanopositioner barrels 2 are part of nanomanipulator 20 and are used to manipulate a sample. Nanostage 3, shown in detail in FIG. 6 below, is used for holding a sample. AFM piezoelectric actuator 4 is also shown with respect to base unit 10. AFM tip 5 is also shown and is part of AFM 30. FIG. 3 shows a front view of the base unit 10 and shows the positions of AFM piezoelectric actuator 4, AFM tip 5, nanopositioner barrels 2, and objective 6 of inverted light microscope 32.

Figure 4A:
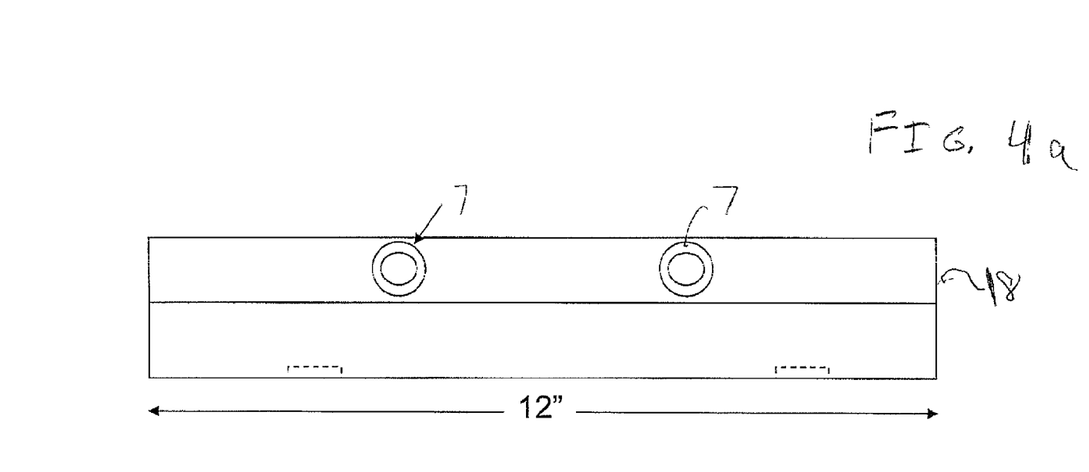
FIGS. 4a-4c show a top view, a front view and a side view, respectively, of a side rear support of the base unit.
Figure 4B:
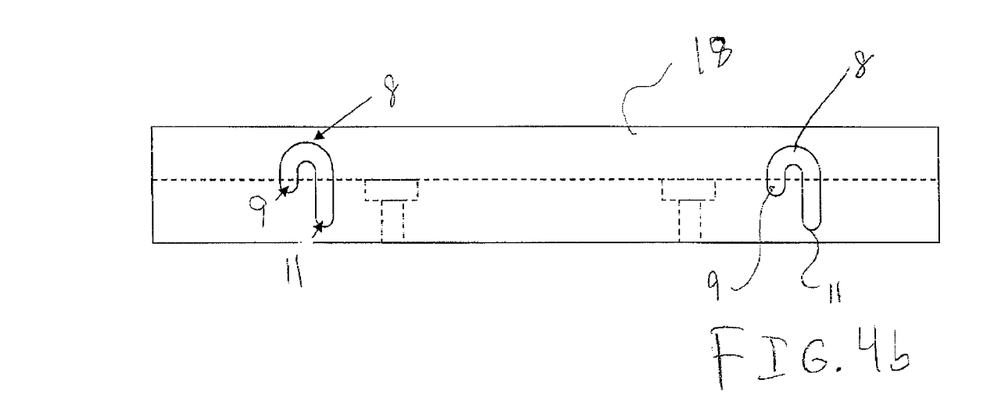
Figure 4C:
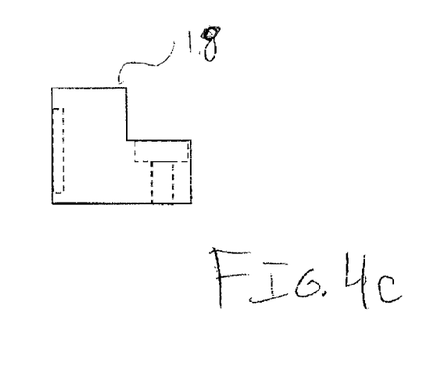
Figure 5A:
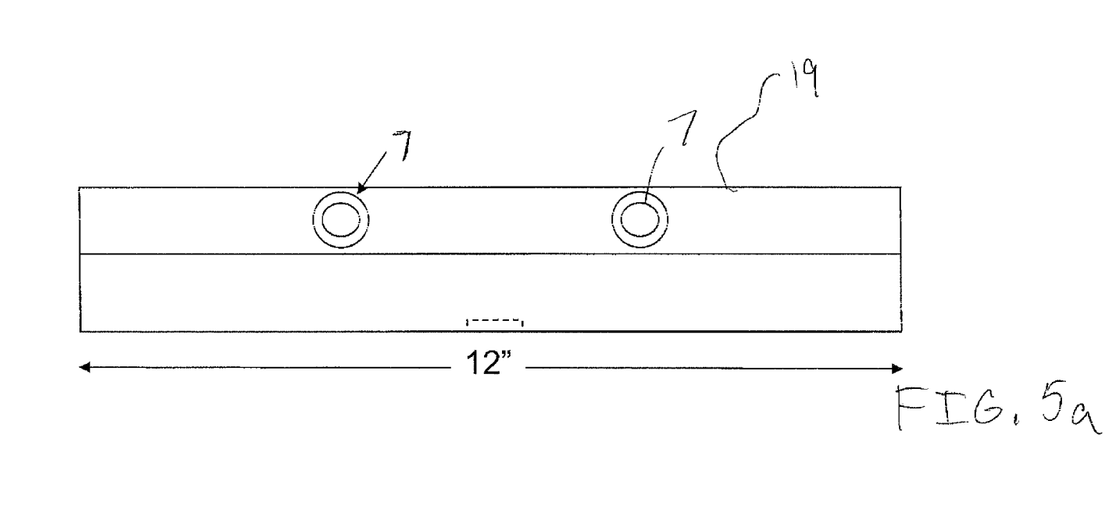
FIGS. 5a-5c show a top view, a front view and side view, respectively, of a side front support of the base unit.
Figure 5B:
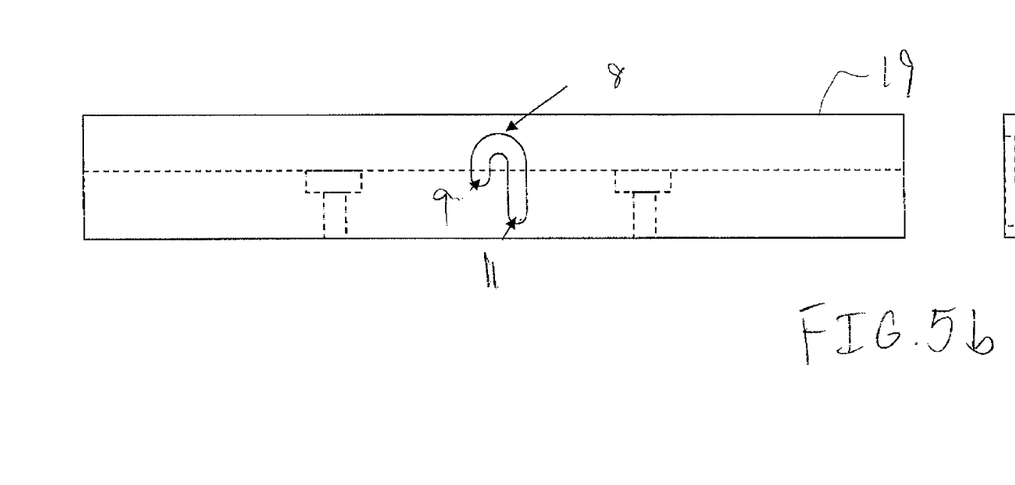
Figure 5C:
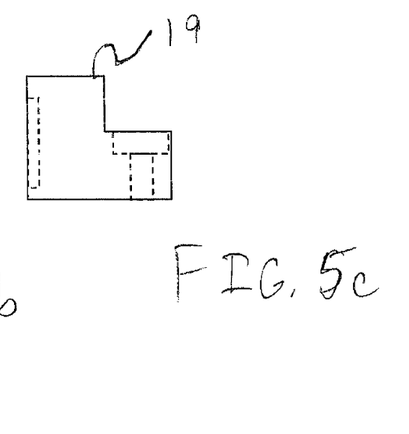

FIGS. 4a-4c show a top view, a front view and a side view of the base unit side rear support 18. FIGS. 5a-5c show a top view, a front view and side view of the base unit side front support 19. Mounting holes 7 are used to mount inverted microscope 32. Pin channels 8 are used for moving base unit 10 to objective change position 9 and to nanomanipulation position 11. Base unit 10 may be moved manually or alternatively may be moved via mechanical means. This permits dual positioning for changing functional objectives depending on the needs required by the experiment.

Figure 6:
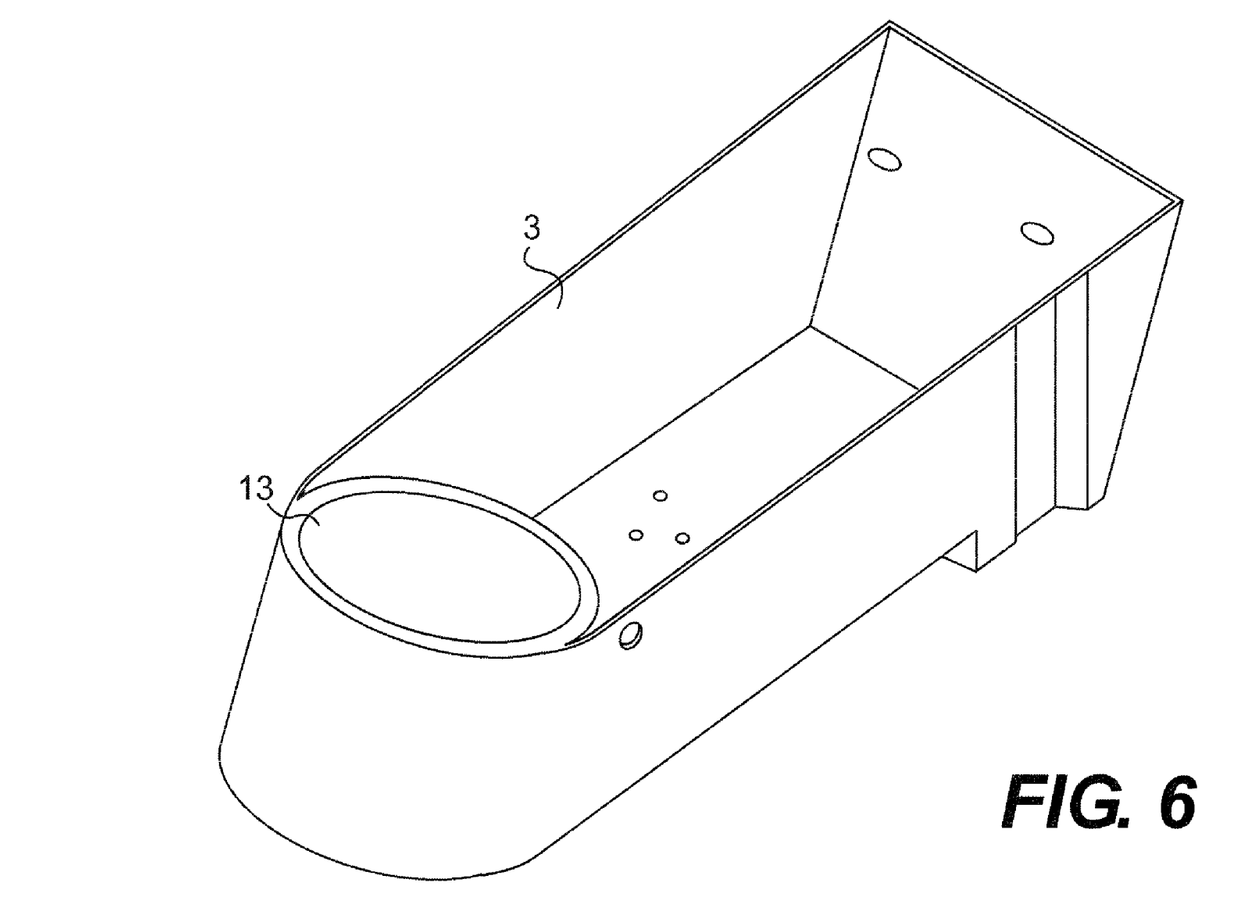
FIG. 6 shows an isometric top down view of a sample stage for use with the base unit.

FIG. 6 shows an isometric top down view of sample stage 3 used with base unit 10. Holding portion 13 holds samples used in experiments. Sample stage 3 has controlled x-y motion with nano-motion actuated motors. An embodiment of sample stage 3 has a vacuum chuck, a recess for a standard coverslip, and a heating control and is usable in a wet mode.

The above-disclosed base unit 10 and integrated device 25 allows for multi-axis nanomanipulation with atomic force microscopy. Currently atomic force microscopy of scanning probe microscopes must be in either imaging mode or manipulation mode and thus do not permit simultaneous imaging and manipulation. Integrated device 25 allows manipulation to be carried out during imaging. This permits high-throughput screening and testing for a variety of applications, which include, but are not limited to, the detection of compounds such as biological warfare agents, neurotoxins, neuropharmaceuticals, and nanomedical devices. Base unit 10 and integrated device 25 will also have a broad impact in the fields of nano-manufacturing, small-scale design, tissue engineering, mechatronics, biosensing, pharmaceutical testing, micro- and nanoscale control, self-assembly, nanoscale imaging, technology-based education and design-based education.

Figure 7:
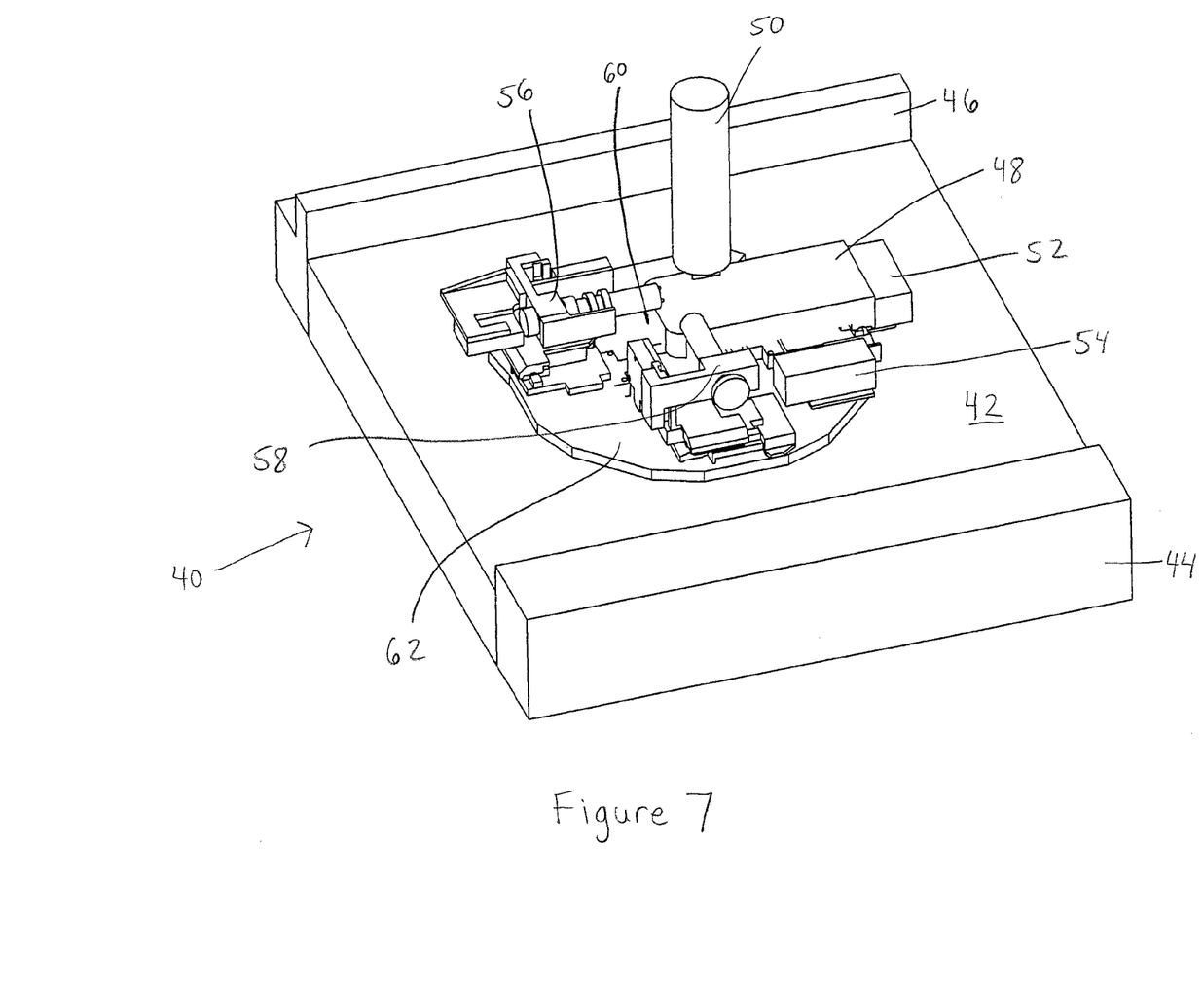
FIG. 7 shows a perspective view of another embodiment of a base unit fitted with linear encoders, a nano-positioner for use with an atomic force microscope.

FIG. 7 shows another embodiment of a base unit adapted for use with a nano-positioner and an atomic force microscope. The device 40 includes an integrative base 42, fitted with a front rail 44 and a rear rail 46. The integrative base 42 is provided with a specimen stage 48 upon which one or more specimens may be located for viewing, positioning and manipulation. Also shown is the head 50 of an atomic force microscope which may be used for detection of various properties of the specimen. Device 40 may also include a microscope objective 60.

Device 40 is provided with lateral linear encoders 52, 54 for positioning the specimen stage 48 and reporting information on the position of the specimen stage 48 to a control system, not shown. Linear encoders 52, 54 are operatively connected to a control system to indicate the horizontal position of the specimen stage 48 in two dimensions to thereby allow use of the control system to control linear encoders 52, 54 for positioning of the specimen stage 48 based on information about the actual position of specimen stage 48 provided by linear encoders 52, 54. In this manner, control of the positioning of the specimen stage 48 can be automated and dictated by user input to, for example, a software-based user interface.

Device 40 is also provided with a nano-manipulator, such as a Zyvex L100™, which may include an x-nano-positioner 56 and a y-nano-positioner 58 for nano-positioning of a specimen located on specimen stage 48 in the x and y directions. The nano-manipulator may also be used for manipulation of the specimen rather than positioning of the specimen. For example, the nano-manipulator may be used to exert tensile forces on the specimen for the purpose of carrying out tensile testing. The nano-manipulator may also be provided with various feedback mechanisms to provide information to a control system thereby allowing automation of some or all of the functions of the nano-manipulator. For example, the nano-manipulator may provide feedback information to a control system on the position of the nano-manipulators, and/or forces exerted on or by the nano-manipulators. Alternatively, conventional optical systems may be employed to provide feedback on the position of one or both of the nano-manipulators.

Figure 8:
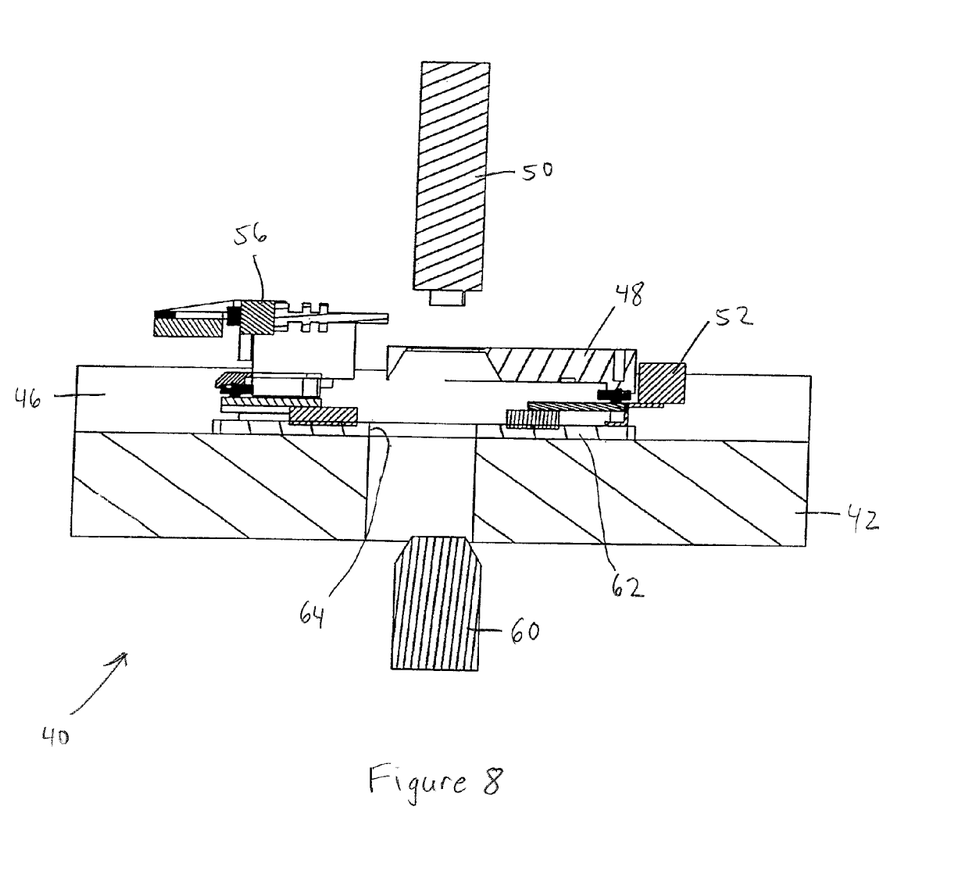
FIG. 8 is a cross-sectional view of the device of FIG. 7 along line VII-VII.
Figure 9:
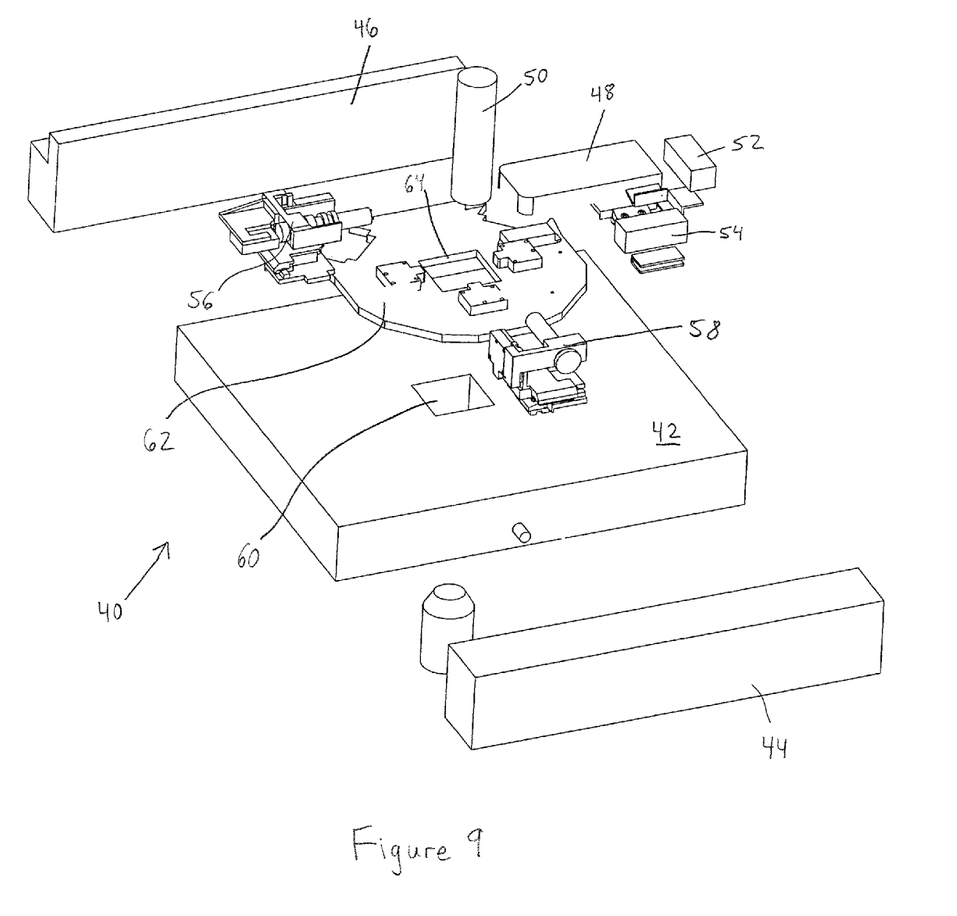
FIG. 9 is an exploded view of the device of FIG. 7.

Specimen stage 48 is movably mounted on a mounting platform 62 for movement in the x and y directions by x- and y-nano-positioners 56, 58. X- and y-nano-positioners 56, 58 are also mounted on mounting platform 62, as are linear encoders 52, 54. Mounting of the various components of device 40 on mounting platform 62 may be via any conventional, suitable mechanical means. Mounting platform 62 includes an opening 64 to permit access to microscope objective 60. Mounting platform 62 may be mounted to integrative base 42 via any conventional, suitable mechanical means.

The particular arrangement of the various components of device 40 provides the ability to simultaneously examine a specimen, position the specimen stage and manipulate the specimen on a nano-scale. This permits a variety of information to be gathered about the specimen. For example, the specimen can be accurately mapped using positioning and an atomic force microscope. The impact of various forces on the specimen can be measured in real-time by exerting such forces on the specimen using the nano-manipulator. This allows, for example, tensile testing, determination of material hardness and deformation characteristics.

Currently, the commercially available Zyvex L100™ runs in an open loop, with a user controlling the three positioners with a joystick. The present invention may optionally be implemented with hardware and software for closing this control loop. The control system of the present invention uses the positions reported by the linear encoders to close the control loop and allow for automatic positioning of the AFM stage. This enables the AFM operator to specify a stage position using software and have the stage move to the specified position under control of the machine based on the positions reported by the linear encoders, instead of having to manually position the stage by hand for every sample. Two immediate benefits of the addition of this technology to the stage are a savings in time for the operator, and a more precise and repeatable stage position for every experiment. The control system may also be extended to control the nano-positioners in which case the feedback device may provide information to the control system regarding one or more of a position or force in relation to said nano-positioners. A user may input control information for controlling one or both of the linear encoders and nano-positioners in an embodiment of a user interface associated with this control system.

The Renishaw™ Optical Linear Encoder is one example of a suitable encoder that may be used with the system of the present invention. The encoder allows for tracking of the stage in both of the horizontal directions. The encoder may be selected so as to perform these measurements to a resolution of 50 nm and a maximum speed of 10 m/s. Similar encoders have been previously used to accurately build stents for arteries. In addition, the encoder is highly accurate and compact. In terms of accuracy, the system has high linearity and reproducibility of data, high signal stability that minimizes cyclic error and incorporates industry standard digital and analog outputs for easy integration across various interfaces.

In an optional embodiment, a temperature control system is provided for regulating the temperature in the vicinity of specimen stage 48. Temperature control may be important in certain measurements since the effects of temperature and thermal noise can be significant when considered on a nano-scale. Temperature control may also be used to permit investigation of the properties of specimens when subjected to temperature changes and/or thermal stress. For example, sample deformation as a function of temperature can be investigated in this manner.

EXAMPLE

The mechanical properties of nerve cells are to be determined by applying forces on the order of piconewtons to the nerve cells. This will be done by a highly parallel microbeam array. By knowing the stiffness of each beam and the distance of displacement, the force applied to the cells can be calculated. This array, when attached to the nanomanipulator, provides a much finer data resolution. To achieve this, a fixture must hold the microbeam array in such a manner that it can be attached to the nanomanipulator. This fixture must also align the beams over a sample of patterned cells.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A device for simultaneous inspection and manipulation of a sample, said device comprising:
    a base unit;
    a sample holder mounted on said base unit;
    an inspection device operatively associated with said base unit for inspecting a sample on said sample holder; and
    at least one nano-manipulator mounted in an operative position on said base unit to permit manipulation of the sample on said sample holder to deform said sample by exerting a force on said sample using said at least one nano-manipulator; wherein said at least one nano-manipulator is mounted such that manipulation of the sample does not prevent operative inspection of said sample by said inspection device during or after manipulation of the sample.

2. A device as claimed in claim 1, comprising at least two said at least one nano-manipulators.

3. A device as claimed in claim 2, wherein said inspection device is a microscope.

4. A device as claimed in claim 3, wherein said inspection device is an atomic force microscope.

5. A device as claimed in claim 2, further comprising at least one linear encoder mounted on said base unit in operative association with said sample holder for positioning said sample holder.

6. A device as claimed in claim 5, comprising at least two said linear encoders positioned substantially perpendicular to one another to permit positioning said sample holder in two-dimensional space.

7. A device as claimed in claim 2, further comprising a control system operatively associated with said at least two nano-manipulator for controlling said nano-manipulators.

8. A device as claimed in claim 7, further comprising a feedback mechanism for providing information to said control system about said nano-manipulators.

9. A device as claimed in claim 8, wherein said feedback mechanism provides information to said control system about one or more of a position, or a force in relation to said nano-manipulators.

10. A device as claimed in claim 9, further comprising a user interface to permit a user to input control information to said control system.

11. A device as claimed in claim 6, further comprising a control system operatively associated with said at least two linear encoders for controlling said linear encoders.

12. A device as claimed in claim 11, further comprising a feedback mechanism for providing information to said control system about said linear encoders.

13. A device as claimed in claim 12, wherein said feedback mechanism provides information to said control system about a position of said linear encoders.

14. A device as claimed in claim 13, further comprising a user interface to permit a user to input control information to said control system.

15. A device for simultaneous inspection and manipulation of a sample, said device comprising:
    a base unit;
    a sample holder mounted on said base unit;
    an inspection device operatively associated with said base unit for inspecting a sample on said sample holder;
    at least one manipulator mounted in an operative position on said base unit to permit manipulation of the sample on said sample holder to deform said sample by exerting a force on said sample using said at least one manipulator; wherein said at least one manipulator is mounted such that manipulation of the sample does not prevent operative inspection of said sample by said inspection device during or after manipulation of the sample; and
    a temperature control mechanism for controlling a temperature of said sample when said sample is on said sample holder.

16. A device for simultaneous inspection and manipulation of a sample, said device comprising:
    a base unit;
    a sample holder mounted on said base unit;
    an inspection device operatively associated with said base unit for inspecting a sample on said sample holder;
    at least two nano-manipulators mounted in an operative position on said base unit to permit nano-manipulation of the sample on said sample holder to deform said sample by exerting a force on said sample using said at least one manipulator; wherein said at least one nano-manipulator is mounted such that nano-manipulation of the sample does not prevent operative inspection of said sample by said inspection device during or after manipulation of the sample; and
    at least two linear encoders mounted on said base unit in operative association with said sample holder for positioning said sample holder.

17. A device as claimed in claim 16, further comprising:
    a control system operatively associated with said at least two linear encoders for controlling said linear encoders;
    a feedback mechanism for providing information to said control system about said linear encoders, wherein said feedback mechanism provides information to said control system about a position of said linear encoders; and
    a user interface to permit a user to input control information to said control system.

18. A device as claimed in claim 17, wherein said control system is also operatively associated with said nano-manipulators for control of said nano-manipulators, said feedback device provides information to said control system about at least one of a position or force in relation to said nano-manipulators and said user interface permits input of control information by a user to said control system for control of said linear encoders and said nano-manipulators.

* * * * *

UNITED STATES PATENT AND TRADEMARK OFFICE
CERTIFICATE OF CORRECTION

PATENT NO. : 7,647,848 B2  Page 1 of 1
APPLICATION NO. : 11/564678
DATED : January 19, 2010
INVENTOR(S) : Layton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this

Sixteenth Day of November, 2010

David J. Kappos
*Director of the United States Patent and Trademark Office*